United States Patent
Aimoto et al.

(10) Patent No.: US 7,261,065 B2
(45) Date of Patent: Aug. 28, 2007

(54) METHOD FOR CONTROLLING COMPRESSION IGNITION INTERNAL COMBUSTION ENGINE

(75) Inventors: Kohjiroh Aimoto, Wako (JP); Kohtaro Hashimoto, Wako (JP); Fumiaki Ikegawa, Wako (JP); Takahiro Gunji, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/344,231

(22) Filed: Feb. 1, 2006

(65) Prior Publication Data

US 2006/0180099 A1    Aug. 17, 2006

(30) Foreign Application Priority Data

Feb. 17, 2005 (JP) ............... 2005-040031

(51) Int. Cl.
*F02B 43/08* (2006.01)
(52) U.S. Cl. .......................... 123/3; 123/1 A
(58) Field of Classification Search ............ 123/3, 123/1 A
See application file for complete search history.

(56) References Cited

U.S. PATENT DOCUMENTS

| | | | |
|---|---|---|---|
| 2,282,599 A | * | 5/1942 | Barnard ............... 123/196 R |
| 4,422,412 A | * | 12/1983 | Norton ............... 123/3 |
| 4,827,048 A | * | 5/1989 | Knifton ............... 568/698 |
| 5,097,803 A | * | 3/1992 | Galvin ............... 123/3 |

FOREIGN PATENT DOCUMENTS

JP    2004-076736 A    3/2004

* cited by examiner

Primary Examiner—Noah P. Kamen
(74) Attorney, Agent, or Firm—Arent Fox LLP

(57) ABSTRACT

The present invention provides a method for controlling a compression ignition internal combustion engine, which can easily cope with a wide range of demand loads. The compression ignition internal combustion engine 1 has a first fuel 2 containing ethanol, and reforming means 5 for reforming the first fuel into a second fuel having higher ignitability than the first fuel, by converting at least one part of ethanol contained in the first fuel 2 to diethyl ether, and each amount of the first fuel and the second fuel to be supplied to the compression ignition internal combustion engine is varied, in accordance with the change of a load required to the compression ignition internal combustion engine 1. Thus, the proportion of the first fuel to the total fuels supplied to the internal combustion engine 1 is increased, with the increase of the demand load, while the proportion of the second fuel to the total fuels supplied to the internal combustion engine 1 is increased, with the decrease of the demand load. The first fuel 2 contains ethanol and a hydrocarbon which is liquid at room temperature.

9 Claims, 2 Drawing Sheets

METHOD FOR CONTROLLING COMPRESSION IGNITION INTERNAL COMBUSTION ENGINE

BACKGROUND OF THE INVENTION

1. Field of the Invention

The present invention relates to a method for controlling a compression ignition internal combustion engine.

2. Description of the Related Art

In recent years, in order to reduce fuel consumption per predetermined load or per predetermined time and a quantity of a discharge in an internal combustion engine, a compression ignition internal combustion engine represented by a homogeneous-charged compression ignition internal combustion engine has been studied. The above described compression ignition internal combustion engine introduces an oxygen-containing gas and a compression self-ignitable fuel into a cylinder, compresses them, and then self-ignites the fuel.

However, the above described compression ignition internal combustion engine has difficulty in controlling the timing of ignition, in contrast to a spark ignition type internal combustion engine. In addition, the above described compression ignition internal combustion engine tends to cause knocking when a demand load of the engine is increased in the case where fuel with high ignitability is used, and tends to cause flame off when a demand load of the engine is decreased in the case where fuel with low ignitability is used. Accordingly, the above described compression ignition internal combustion engine has a problem that a safely operatable range is narrow.

In order to solve the above described problem, a technology has been conventionally known which prepares two types of fuels with high ignitability and low ignitability, mixes both fuels, and supplies the mixture to the above described compression ignition internal combustion engine (for instance, Japanese Patent Laid-Open No. 2004-76736). According to the above described technology, the above described compression ignition internal combustion engine can be stably operated in a wide range of demand loads, by adjusting a ratio between both the fuels to be supplied to the engine in correspondence with the demand load.

However, the above described technology has such inconvenience that two fuels with high ignitability and low ignitability are necessary to be separately charged.

SUMMARY OF THE INVENTION

An object of the present invention is to provide a method for controlling a compression ignition internal combustion engine which uses a single charged fuel but can easily cope with a wide range of demand loads, in order to solve the above inconvenience.

In order to achieve the above object, the present invention provides a method for controlling a compression ignition internal combustion engine which introduces an oxygen-containing gas and a compression self-ignitable fuel into a cylinder, and self-ignites the mixture by compressing the same, the compression ignition internal combustion engine comprising a first fuel containing ethanol, and reforming means for reforming the first fuel into a second fuel having higher ignitability than the first fuel, by converting at least one part of ethanol contained in the first fuel to diethyl ether, and the method comprising varying each amount of the first fuel and the second fuel to be supplied to the compression ignition internal combustion engine, in accordance with the change in a demand load of the compression ignition internal combustion engine.

In the fuel for the above described compression ignition internal combustion engine, ethanol has low ignitability and diethyl ether has high ignitability. However, ethanol is easily converted to diethyl ether through a dehydration condensation reaction using a catalyst of an acid. The above described dehydration condensation reaction is shown in the following expression.

$2C_2H_5OH \rightarrow C_2H_5OC_2H_5 + H_2O$

Accordingly, the method according to the present invention only requires the first fuel including ethanol as single fuel, and can obtain the second fuel having higher ignitability than the first fuel as needed, by converting at least one part of ethanol included in the first fuel into diethyl ether through the above described reforming means.

Then, the compression ignition internal combustion engine can be stably operated in a wide range of demand loads, by varying each amount of the first fuel and the second fuel to be supplied in correspondence with the demand load.

The above described compression ignition internal combustion engine increases the possibility of causing knocking with the increase of the demand load. Then, the compression ignition internal combustion engine in the present invention preferably varies each amount of the first fuel and the second fuel to be supplied, so as to increase a proportion of the first fuel to the total fuels supplied, as the demand load increases and gets a higher possibility of causing knocking. Because the first fuel includes ethanol with low ignitability, the above described compression ignition internal combustion engine can prevent knocking even when the demand load has been increased, by increasing a proportion of the first fuel to the total fuels supplied, and consequently by delaying the timing of self-ignition.

On the other hand, the above described compression ignition internal combustion engine increases the possibility of causing flame off with the decrease of the demand load. Then, the compression ignition internal combustion engine in the present invention preferably varies each amount of the first fuel and the second fuel to be supplied, so as to increase a proportion of the second fuel to the total fuels supplied, as the demand load decreases and gets a higher possibility of causing flame off. Because the second fuel includes diethyl ether formed by the conversion of at least one part of ethanol included in the first fuel, it has higher ignitability than the first fuel has. Accordingly, the above described compression ignition internal combustion engine can prevent flame off even when the demand load has been decreased, by increasing a proportion of the second fuel to the total fuels supplied to itself, and consequently by moving the timing of self-ignition ahead.

The above described first fuel can employ a fuel containing ethanol and a hydrocarbon which is liquid at room temperature. The above described hydrocarbon which is liquid at room temperature includes, for instance, n-heptane.

DETAILED DESCRIPTION OF THE PREFERRED EMBODIMENTS

Figure 1:
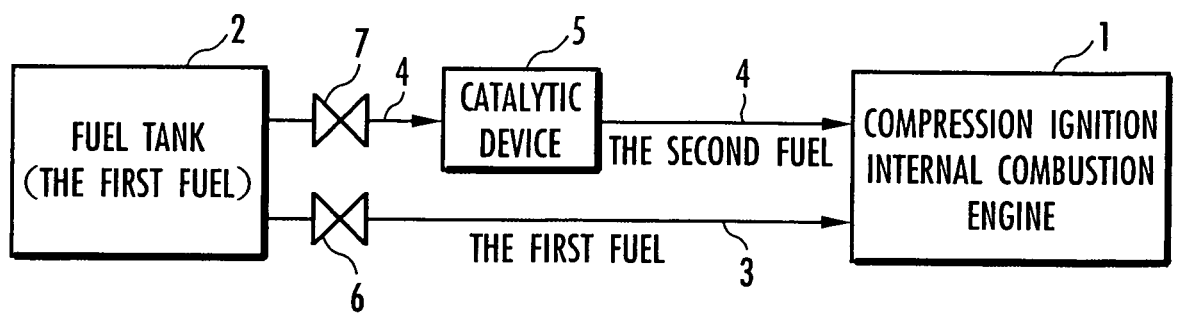
FIG. 1 is a block diagram showing one embodiment of a control method according to the present invention.

In the next place, preferred embodiments according to the present invention will be described in further detail with reference to the attached drawings. A control method according to the present embodiment can be conducted by using a compression ignition internal combustion engine 1 shown in FIG. 1. The compression ignition internal combustion engine 1 has a fuel tank 2, which accommodates a first fuel containing ethanol and is connected to the compression ignition internal combustion engine 1 through feeding ducts 3 and 4. The feeding duct 3 is connected to the compression ignition internal combustion engine 1, and the feeding duct 4 has a catalytic device 5 which accommodates a catalyst for converting ethanol to diethyl ether, on the way to the combustion engine 1. The catalytic device 5 is a reforming means for reforming the first fuel to a second fuel having higher ignitability than the first fuel has, by converting ethanol contained in the first fuel to diethyl ether. The feeding duct 3 has a flow regulating valve 6 installed on the way close to the fuel tank 2, and the feeding duct 4 has a flow regulating valve 7 installed between the fuel tank 2 and the catalytic device 5.

In the method for controlling the compression ignition internal combustion engine 1 according to the present embodiment, the first fuel accommodated in a fuel tank 1 is directly supplied from a feeding duct 3 to the internal combustion engine 1 by opening a flow regulating valve 6, and concurrently supplies the first fuel accommodated in the fuel tank 2 to a catalytic device 5 by opening the flow regulating valve 7 at a predetermined rate in accordance with a load required to the internal combustion engine 1, and then to the internal combustion engine 1 therefrom. As a result of this, the first fuel supplied to the catalytic device 5 is reformed to the second fuel having higher ignitability than the first fuel has, because ethanol in the first fuel is converted to diethyl ether by coming into contact the catalyst in the catalytic device 5.

As a result, the first fuel which includes ethanol and has low ignitability is supplied to a compression ignition internal combustion engine 1 through a feeding duct 3, and the second fuel is supplied thereto through the feeding duct 4, which has been reformed by converting ethanol to diethyl ether so as to have higher ignitability than that of the first fuel. Then, the ignitability of the fuel to be supplied to the compression ignition internal combustion engine 1 can be adjusted in accordance with a load required thereto, by adjusting each opening of flow regulating valves 6 and 7 and thereby adjusting each amount of the first fuel and the second fuel to be supplied to the compression ignition internal combustion engine 1.

Specifically, when a compression ignition internal combustion engine 1 is required to output a high load and tends to cause knocking, each opening of flow regulating valves 6 and 7 is adjusted, so as to increase the proportion of the first fuel to the total fuels supplied to the internal combustion engine 1, with the increase of the demand load. Because the first fuel includes ethanol with low ignitability, the compression ignition internal combustion engine 1 can be stably operated by adjusting each opening of the flow regulating valves 6 and 7, consequently delaying the timing of self-ignition of the total fuel supplied to the compression ignition internal combustion engine 1, and thereby preventing knocking even when the demand load increases.

In contrast, when a compression ignition internal combustion engine 1 is required to output a low load and tends to cause flame off, each opening of flow regulating valves 6 and 7 is adjusted, so as to increase the proportion of the second fuel to the total fuels supplied to the internal combustion engine 1, with the decrease of the demand load. The second fuel includes diethyl ether formed by the conversion of at least one part of ethanol contained in the first fuel, and has higher ignitability than that of the first fuel. Accordingly, the compression ignition internal combustion engine 1 can be stably operated by adjusting each opening of the flow regulating valves 6 and 7 as described above, consequently moving the timing of self-ignition of the total fuel supplied to the compression ignition internal combustion engine 1 ahead, and thereby preventing flame off even when the demand load decreases.

In the above adjustment, when a demand load of the compression ignition internal combustion engine 1 is sufficiently high, it is also permissible to close the flow regulating valve 7, open only the flow regulating valve 6, and supply only the first fuel to the compression ignition internal combustion engine 1. In contrast, when the demand load is sufficiently low, it is also permissible to close the flow regulating valve 6, open only the flow regulating valve 7, and supply only the second fuel which has been reformed by a catalytic device 5, to the compression ignition internal combustion engine 1.

The first fuel including ethanol accommodated in a fuel tank 2 includes: a fuel containing hydrocarbon which is liquid at room temperature, such as n-heptane ($C_7H_{16}$), added with ethanol; single ethanol; a mixture of ethanol and naphtha; a mixture of ethanol and gasoline; a mixture of ethanol and kerosene; a mixture of ethanol and gas oil; and a mixture of ethanol and a fatty ester.

The above described ethanol can be obtained by fermenting a vegetable substance like a farm product such as sugarcane and corn, and distilling the fermented product. In the vegetable substance, a plant as the raw material has already absorbed carbon dioxide. Accordingly, even when ethanol obtained from the above described vegetable substance is combusted, the amount of exhausted carbon dioxide is equal to the amount of carbon dioxide absorbed by the above described plant itself. In other words, the ethanol can attain a so-called carbon neutral effect which means that the total amount of exhausted and absorbed carbon dioxide becomes theoretically zero, can reduce the amount of exhausted carbon dioxide, and can contribute to the prevention of global warming.

In the next place, the ignitability of three types of fuels was compared which were a fuel of only n-heptane, a fuel (the first fuel) consisting of n-heptane and ethanol in an amount of 20 wt. % with respect to the total weight, and a fuel (the second fuel) consisting of n-heptane and diethyl ether in an amount of 16 wt. % with respect to the total weight. The above described second fuel which consists of n-heptane and diethyl ether in an amount of 16 wt. % with respect to the total weight corresponds to the fuel in which all the ethanol in the above described first fuel consisting of n-heptane and ethanol in an amount of 20 wt. % with respect to the total weight is converted to diethyl ether.

Ignitability was evaluated by measuring an ignition-delayed time which is defined as a period of time after each of the above described fuels was injected into the air which had been heated to 500° C. in a vessel pressurized to 2.0 MPa, and before the pressure in the vessel increases by 0.02 MPa.

The above described ignition-delayed periods of time were compared as a measure of ignitability. The results are shown in FIG. 2.

Figure 2:
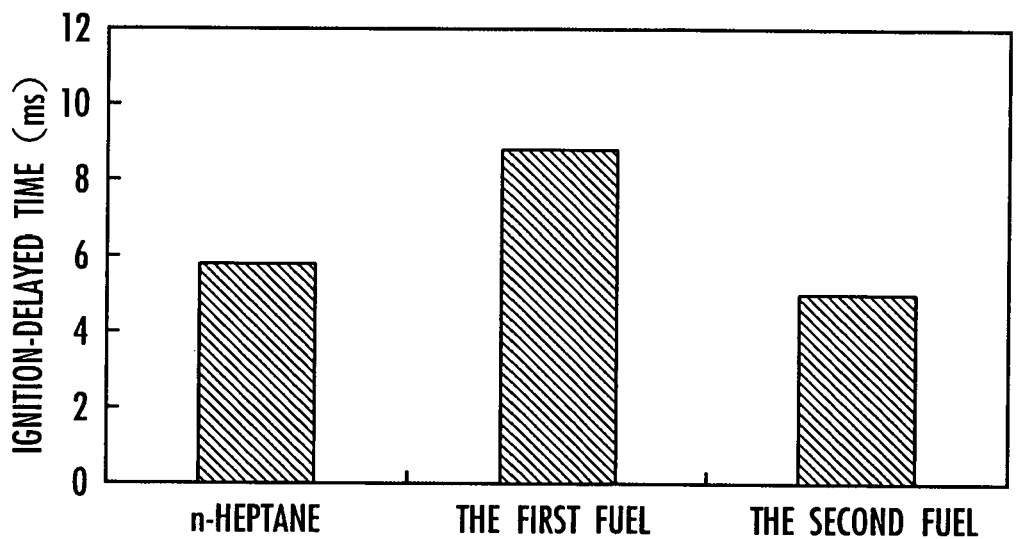
FIG. 2 is a diagrammatic drawing showing the ignitability of various fuels.

Taking the fuel of single n-heptane as a reference, it is obvious from FIG. 2 that the above described first fuel shows a longer ignition-delayed time, or equivalently has lower ignitability than the reference. It is also obvious that the above described second fuel shows a shorter ignition-delayed time, or equivalently has higher ignitability than the reference. Accordingly, it is obvious that the compression ignition internal combustion engine 1 can be stably operated in a wide range of demand loads, by varying each amount of the first fuel and the second fuel to be supplied in correspondence with the demand load.

A catalyst accommodated in a catalytic device 5 is preferably a solid acid, because it can be handled easily. The above described solid acid includes activated alumina, heteropolyacid, zeolite, silica alumina, sulfated zirconia and an ion exchange resin. The above described heteropolyacid includes 12tungstophosphoric acid, and the above described ion exchange resin includes Nafion (registered trademark) and Amberlyst (registered trademark).

In a catalytic device 5, a catalyst converts ethanol to diethyl ether usually at 300° C. or lower, though depending on the type of the catalyst. It means that the catalytic device 5 can sufficiently convert ethanol to diethyl ether, by using gas exhausted from a compression ignition internal combustion engine 1 as a heat source.

Figure 3:
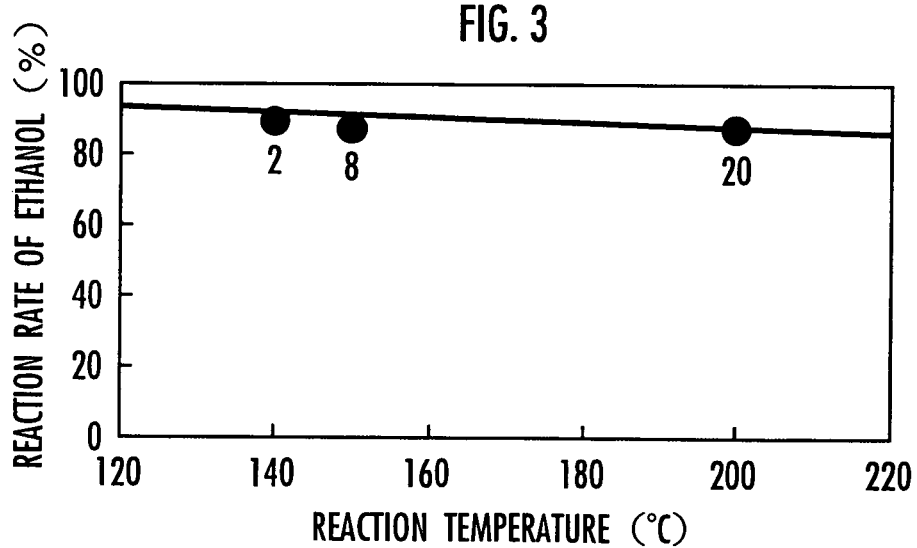
FIG. 3 is a diagrammatic drawing showing a conversion rate of ethanol to diethyl ether at reaction temperatures.

In the next place, ethanol was converted to diethyl ether by using a catalyst, which is accommodated in a catalytic device 5, having 12tungstophosphoric acid of a heteropolyacid. (containing 12tungstophosphoric acid in the amount of 30 wt. % with respect to the total weight of catalysts) fixed in porous silica. A relationship between a reaction temperature and a conversion rate of ethanol to diethyl ether (reacted rate of ethanol) is shown in FIG. 3. In FIG. 3, a continuous line shows an equilibrium conversion rate, and a numerical value under each measurement point shows an amount of supplied ethanol with respect to 1 g of the above described catalyst by a weight space velocity ($h^{-1}$).

It is obvious from FIG. 3 that a reaction proceeds at any measurement point until the reaction approximately reaches equilibrium, and that particularly at a reaction temperature of 200° C., the reaction reaches equilibrium when even 20 g per hour of ethanol was supplied to 1 g of a catalyst. It clearly means that the above described catalyst of even a slight amount can convert ethanol to diethyl ether.

Figure 4:
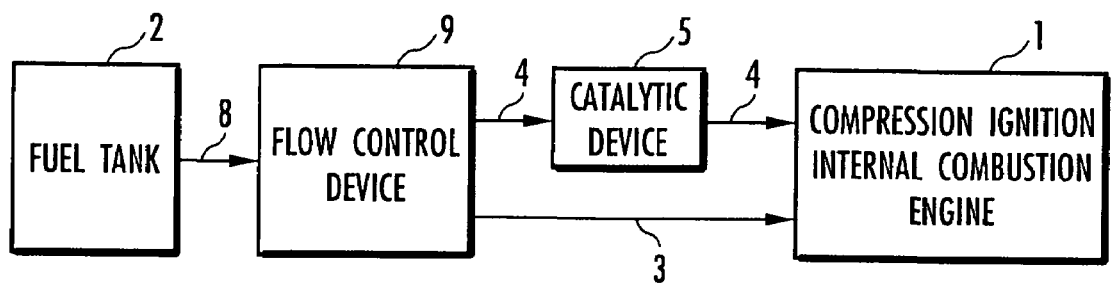
FIGS. 4 to 6 are block diagrams showing other embodiments of a control method according to the present invention.

In the next place, other embodiments will be described. The compression ignition internal combustion engine 1 shown in FIG. 1 has flow regulating valves 6 and 7 installed in feeding ducts 3 and 4, to adjust a ratio of the first fuel to the second fuel, but it is also permissible to prepare a flow control device 9 between the fuel tank 2 and the catalytic device 5 as shown in FIG. 4, while connecting the flow control device 9 to a fuel tank 2 through a main feeding duct 8, and to prepare the feeding ducts 3 and 4 so as to branch from the flow control device 9. The compression ignition internal combustion engine 1 shown in FIG. 4 has no flow regulating valves 6 and 7 in the feeding ducts 3 and 4, but adjusts the ratio of the first fuel to the second fuel by the flow control device 9.

Figure 5:
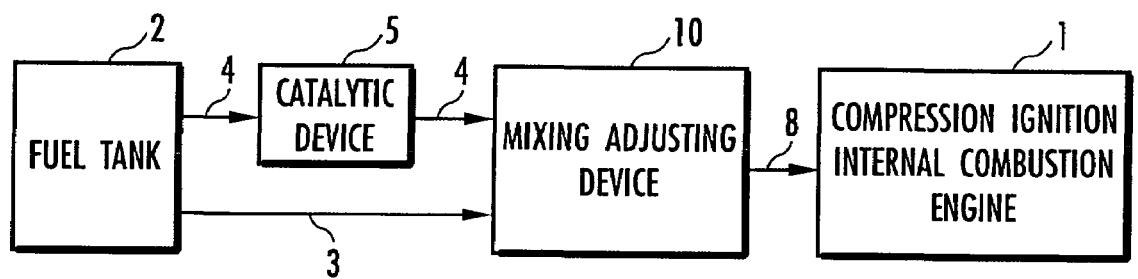

It is also permissible to prepare a mixing adjusting device 10, as shown in FIG. 5, between the catalytic device 5 and the compression ignition internal combustion engine 1 so as to be connected with feeding ducts 3 and 4, and to connect the mixing adjusting device 10 with the compression ignition internal combustion engine 1 through the main feeding duct 8. The compression ignition internal combustion engine 1 shown in FIG. 5 has no flow regulating valves 6 and 7 in the feeding ducts 3 and 4, but the mixing adjusting device 10 mixes the first fuel with the second fuel at a predetermined rate, and supplies them to the compression ignition internal combustion engine 1.

Figure 6:
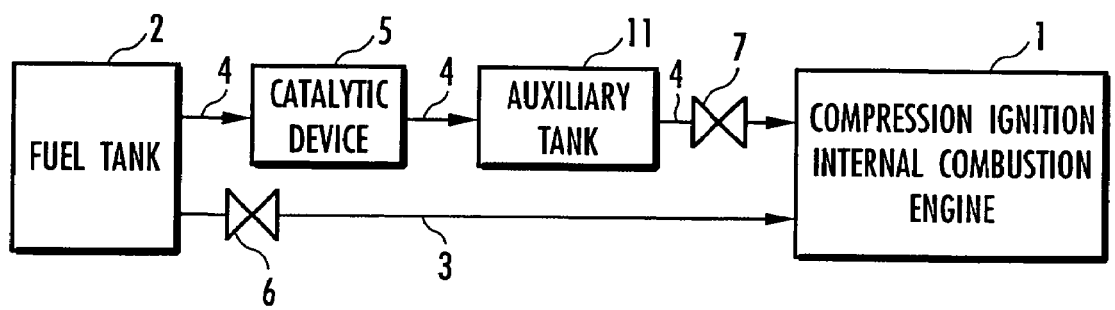

Furthermore, it is permissible to prepare an auxiliary tank 11 for accommodating the second fuel, as shown in FIG. 6, between the catalytic device 5 in the feeding duct 4 and the compression ignition internal combustion engine 1, and to prepare the flow regulating valve 7 between the auxiliary tank 11 and the compression ignition internal combustion engine 1. The compression ignition internal combustion engine 1 shown in FIG. 6 can quickly cope with the decrease in the demand load of the compression ignition internal combustion engine 1, by supplying the fuel with decreased ignitability, which has been previously accommodated in the auxiliary tank 11, to the compression ignition internal combustion engine 1 through the flow regulating valve 7. The compression ignition internal combustion engine 1 shown in FIG. 6 adjusts the ratio of the first fuel and the second fuel, by adjusting each opening of the flow regulating valves 6 and 7.

What is claimed is:

1. A method for controlling a homogeneous-charged compression ignition internal combustion engine which introduces a mixture of an oxygen-containing gas and a compression self-ignitable fuel into a cylinder, and self-ignites the mixture by compressing the same, the homogeneous-charged compression ignition internal combustion engine comprising a first fuel including ethanol, and reforming means for reforming the first fuel into a second fuel having higher ignitability than the first fuel, by converting at least one part of ethanol included in the first fuel to diethyl ether, and the method comprising varying each amount of the first fuel and the second fuel to be supplied to the homogeneous-charged compression ignition internal combustion engine, in accordance with the change in a demand load of the homogeneous-charged compression ignition internal combustion engine.

2. The method for controlling the homogeneous-charged compression ignition internal combustion engine according to claim 1, wherein each amount of the first fuel and the second fuel to be supplied to the homogeneous-charged compression ignition internal combustion engine is varied, so as to increase the proportion of the first fuel to the total fuels supplied to the internal combustion engine, with the increase a demand load of the homogeneous-charged compression ignition internal combustion engine; and each amount of the first fuel and the second fuel to be supplied to the homogeneous-charged compression ignition internal combustion engine is varied, so as to increase the proportion of the second fuel to the total fuels supplied to the internal combustion engine, with the decrease of a demand load of the homogeneous-charged compression ignition internal combustion engine.

3. The method for controlling the homogeneous-charged compression ignition internal combustion engine according to claim 1, wherein the first fuel contains only ethanol.

4. The method for controlling the homogeneous-charged compression ignition internal combustion engine according to claim 1, wherein the first fuel includes ethanol and a hydrocarbon which is liquid at room temperature.

5. The method for controlling the homogeneous-charged compression ignition internal combustion engine according to claim 4, wherein the hydrocarbon which is liquid at room temperature is at least one hydrocarbon selected from the group consisting of n-heptane naphtha, gasoline, kerosene, gas oil and a fatty ester.

6. The method for controlling the homogeneous-charged compression ignition internal combustion engine according to claim 1, wherein the reforming means is a catalytic device comprising a catalyst.

7. The method for controlling the homogeneous-charged compression ignition internal combustion engine according to claim 6, wherein the catalyst is at least one solid acid selected from the group consisting of activated alumina, a heteropolyacid, zeolite, silica alumina, sulfated zirconia, and an ion exchange resin.

8. The method for controlling the homogeneous-charged compression ignition internal combustion engine according to claim 7, wherein the heteropolyacid is 12-tungstophosphoric acid.

9. The method for controlling the homocieneous-charged compression ignition internal combustion engine according to claim 6, wherein the catalyst is a catalyst having 12-tungstophosphoric acid fixed in porous silica.

* * * * *